United States Patent
Ceruti et al.

(10) Patent No.: US 7,023,714 B2
(45) Date of Patent: Apr. 4, 2006

(54) VOLTAGE CONVERTER FOR A POWER SUPPLY

(75) Inventors: Daniele Ceruti, Peschiera Borromeo (IT); Silvio De Simone, Busto Arsizio (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 63 days.

(21) Appl. No.: 10/497,339

(22) PCT Filed: Nov. 20, 2002

(86) PCT No.: PCT/IB02/04900

§ 371 (c)(1),
(2), (4) Date: Jun. 1, 2004

(87) PCT Pub. No.: WO03/049269

PCT Pub. Date: Jun. 12, 2003

(65) Prior Publication Data

US 2005/0018455 A1  Jan. 27, 2005

(30) Foreign Application Priority Data

Dec. 5, 2001 (EP) .................................. 01204682

(51) Int. Cl.
*H02H 7/122* (2006.01)
(52) U.S. Cl. .................. 363/56.12; 363/45; 363/21.01
(58) Field of Classification Search .................. 363/16, 363/21.01, 39, 40, 45, 49, 56.09, 56.1, 56.11, 363/56.12; 361/91.7; 315/219
See application file for complete search history.

(56) References Cited

U.S. PATENT DOCUMENTS

| | | | | |
|---|---|---|---|---|
| 5,115,185 A | * | 5/1992 | Fraidlin et al. | 363/45 |
| 5,453,665 A | * | 9/1995 | Konopka | 315/219 |
| 5,471,376 A | * | 11/1995 | Tsai et al. | 363/56.12 |
| 5,636,114 A | * | 6/1997 | Bhagwat et al. | 363/56.12 |
| 5,978,238 A | * | 11/1999 | Liu | 363/56.09 |

FOREIGN PATENT DOCUMENTS

JP  06351250 A  12/1994

* cited by examiner

*Primary Examiner*—Jessica Han

(74) *Attorney, Agent, or Firm*—Larry Liberchuk

(57) ABSTRACT

A SEPIC type voltage converter (101) comprises a transformer (40) having a primary winding (41) and a storage capacitor (33) connected in series, and a controllable switch (51) coupled in parallel with said series combination. The transformer has a first secondary winding ($42_1$) and a first rectifying diode ($43_1$) connected in series, and a first capacitor ($44_1$) coupled in parallel with said series combination, one terminal of said first capacitor ($44_1$) being coupled to an output terminal ($45_1$). The voltage converter also comprises feedback means (50; 53, 52) coupled to said output terminal ($45_1$) and controlling said controllable switch (51). The transformer further has a second secondary winding (62) and a second rectifying diode (63) connected in series, wherein this series combination is also coupled to said output terminal ($45_1$) in order to limit the voltage across the storage capacitor.

11 Claims, 3 Drawing Sheets

VOLTAGE CONVERTER FOR A POWER SUPPLY

The present invention relates in general to a voltage converter for a power supply, more particularly a power supply for electronic apparatus such as monitors or televisions which are to be connected to an AC mains.

Such a converter should be able to operate at a relatively large range of AC input voltages. Furthermore, such a converter should comply with requirements relating to the reduction of distortion of the mains voltage (reduction of mains harmonics). Moreover, there is the desire to keep costs as low as possible.

Although many known designs for such a converter are capable of meeting the above technical requirements, many of them designs are quite complex and/or expensive. Perhaps the cheapest known design for such a converter which meets the above technical requirements is the SEPIC design (Single Ended Primary Inductor Current). Such a design also has the advantage of allowing an output voltage control loop with a relatively large bandwidth.

In such a SEPIC converter, the voltage across the energy storage capacitor may be quite high (more than 530 V), depending on circumstances. Therefore, the energy storage capacitor should be of a type capable to withstand such high voltages. This makes such capacitors relatively expensive.

It is, inter alia, an object of the present invention to provide a solution to this problem. The invention is defined by the independent claims. The dependent claims define advantageous embodiments.

In an advantageous embodiment the present invention provides a voltage converter for a power supply which combines all advantages of a known SEPIC converter with the advantage of lower cost requirements for the energy storage capacitor.

In a preferred embodiment, a voltage converter for a power supply in accordance with the present invention is provided with voltage clamping means for clamping the voltage across the energy storage capacitor to such a voltage level that a standard capacitor of lower voltage specifications can be used.

In principle, such voltage clamping means may be associated with the energy storage section of the converter; however, in a preferred embodiment, such voltage clamping means are associated with the energy transfer section of the converter, in order to improve the efficiency of the power supply. Specifically, the invention proposes a transformer with an auxiliary secondary winding, coupled to a reference voltage through a diode. Advantageously, this reference voltage is a controlled output voltage.

These and other aspects, features and advantages of the present invention will be explained in more detail by the following description of a preferred embodiment of a power supply according to the present invention, with reference to the drawings, in which identical reference numerals indicate the same or similar components, and in which:

FIG. 1 schematically shows of a SEPIC converter;

Figure 1:
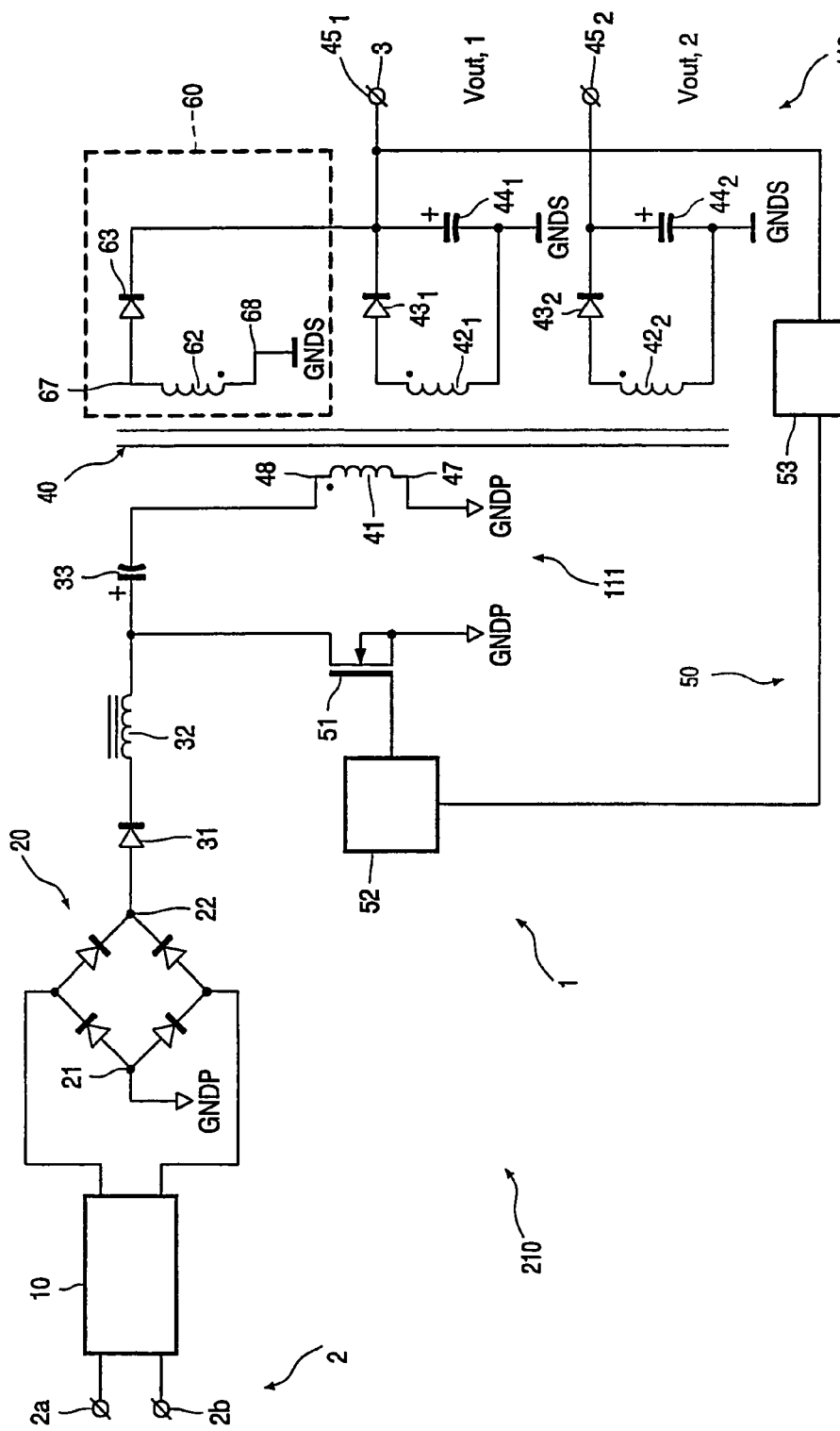

FIG. 1 schematically shows the general design of a SEPIC converter, generally denoted by reference numeral 1. The converter 1 is part of a power supply 210 which has an input 2 comprising two input terminals 2a, 2b for connection to AC mains, and one or more outputs 3 for providing one or more output voltages, depending on the requirements of the apparatus in which the power supply is to be used. For instance, in a television apparatus, low voltage levels are required for logic circuits and high voltage levels are required for operation of the tube.

The input voltage is rectified, in this example by a full wave bridge rectifier 20, which is coupled to the input terminals 2a, 2b through a filter and protection circuit 10. The rectifier 20 has a negative output terminal 21 connected to a reference voltage line, the voltage level of which will be indicated as zero volts. This reference voltage line will be indicated as primary ground GNDP.

The rectifier 20 has a positive output terminal 22 connected to a series arrangement of a primary diode 31, an inductor 32, a storage capacitor 33, and, in the embodiment shown, a primary winding 41 of a transformer 40. The transformer 40 comprises a plurality of secondary windings 42, individually indicated by an index; in FIG. 1, two of such secondary windings $42_1$ and $42_2$ are shown. Each secondary winding $42_i$ is connected in series with an associated rectifier diode $43_i$ and associated smoothing capacitor $44_i$. The node between secondary winding $42_i$ and associated smoothing capacitor $44_i$ is connected to a reference voltage line which will be indicated as secondary ground GNDS. The node between rectifier diode $43_i$ and smoothing capacitor $44_i$ is connected to an associated output terminal $45_i$, for providing an output voltage $V_{OUT,i}$. Generally speaking, the output voltage $V_{OUT,i}$ depends on the input voltage at input 2 and the ratio of windings 41 and $42_i$.

The converter 1 further comprises a feedback control loop 50 for regulating the voltage level of the output voltages $V_{OUT,i}$. This feedback control loop 50 comprises a switching device 51 having a control input connected to a control circuit 52, which is coupled to at least one of the output terminals $45_i$ (in the example: output terminal $45_1$) through a feedback circuit 53. Since SEPIC converters are known from the 28$^{th}$ annual IEEE, volume: 1, 1997 publication entitled "A single-switch, single-stage active power factor corrector with high quality input and output" (pages 385–391) by Schenk, K. and Cuk, S., while the design of control circuit 52 and feedback circuit 53 is of no interest for the discussion of the present invention, it will not be necessary to discuss here the design details of the control circuit 52 and the feedback circuit 53.

The switching device 51 is coupled between primary ground GNDP and the node between inductor 32 and storage capacitor 33. Typically, the switching device 51 is implemented by a power MOSFET or a power transistor, having its drain or collector, respectively, connected to said node, and having its source or emitter, respectively, coupled to primary ground GNDP, either directly or through a sense resistor (not shown in FIG. 1). The control circuit 52 drives the switching device 51 to either a conductive state or a non-conductive state; regulation of the output voltage is obtained by regulating the duty cycle. Again, since SEPIC converters are known per se, the regulation mechanism will not be explained here in more detail.

A power supply with the design as illustrated in FIG. 1 may be used, for example, in apparatuses which have to be in compliance with Mains Harmonic Reduction requirements (see EN610003-3-2 for Europe and the equivalent for Japan).

Figure 2:
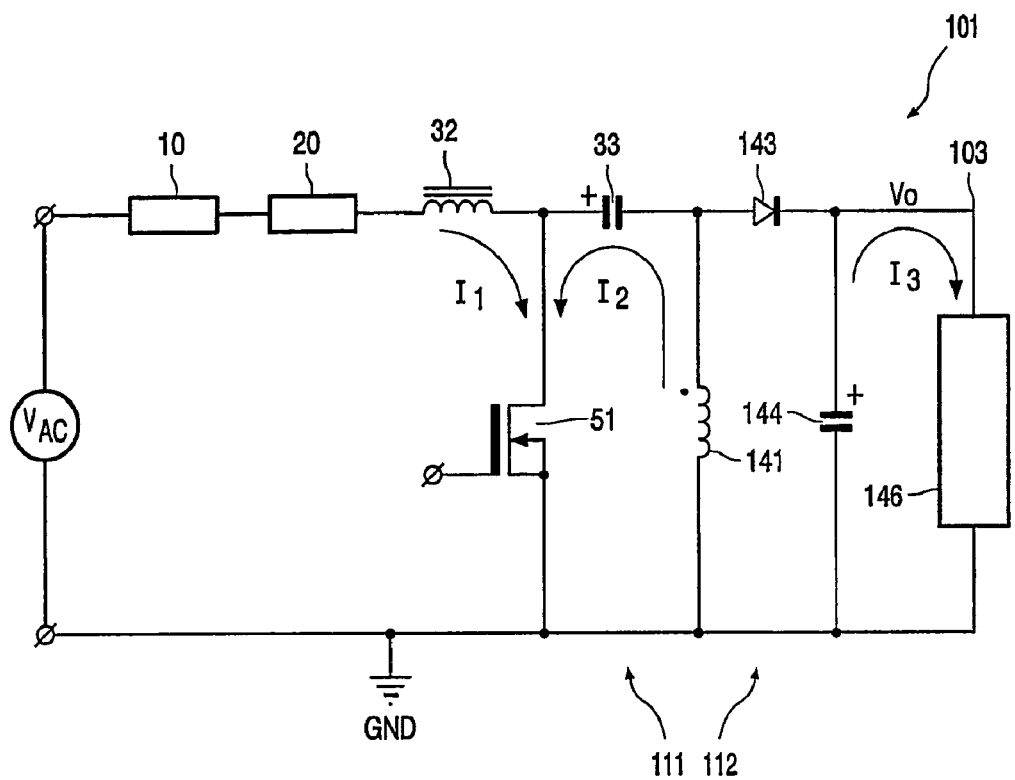
FIG. 2 is a simplified diagram of a SEPIC converter in order to illustrate its operation.

FIG. 2 shows a simplified diagram of an embodiment 101 as an alternative to the embodiment of FIG. 1. In this alternative embodiment, the transformer 40 with primary side and secondary side has been replaced by an inductor 141. In FIG. 2, diode 31 is omitted, and the feedback loop 50 is not shown either. Furthermore, only one output 103 is shown. This alternative embodiment 101 will behave just like the original embodiment 1 of FIG. 1, but it is easier to recognize such behavior; therefore, for explaining the operation of a SEPIC converter, reference will mainly be made to FIG. 2. In order to make a distinction between the FIG. 1 embodiment 1 and the FIG. 2 embodiment 101, the components of the FIG. 2 embodiment 101 will also be indicated as "equivalent" components.

In the FIG. 2 embodiment 101, equivalent inductor 141 represents the inductive characteristics of the transformer 40 as a whole, including all secondary windings 42. All rectifier diodes 43 are replaced by an equivalent rectifier diode 143, and all smoothing capacitors 44 are replaced by an equivalent smoothing capacitor 144. An equivalent load 146 represents the loads of all outputs 3. The distinction between primary ground and secondary ground is now gone.

The voltage at the equivalent output 103 is proportional to the output voltage $V_{out,i}$ at the output terminals $45_i$, according to the formula $V_O/V_{OUT,i} = N41/N42_i$, wherein $V_O$ represents the voltage at the equivalent output 103; N41 represents the number of turns of the primary winding 41; $N42_i$ represents the number of turns of the corresponding secondary winding $42_i$. In the above formula, deviations due to losses are ignored for the sake of convenience.

The operation of a SEPIC converter will be explained hereinafter with reference to FIG. 2. Two phases will be defined: an ON phase when switch 51 is conductive, and an OFF phase when switch 51 is non-conductive, the duration of the ON and OFF phases being of course controlled by the control unit 52 which is not shown in FIG. 2.

On Phase

During the ON phase, a first current I1 flows through inductor 32 and switch 51, and a second current I2 flows through equivalent inductor 141 and switch 51. These currents store energy in said inductors. Therefore, the section of the circuit including inductor 32, storage capacitor 33 and inductor 41; 141 will also be indicated as energy storage section 111. Equivalent load 146 draws current I3 from equivalent capacitor 144.

Off Phase

During the OFF phase, inductors 32 and 141 continue providing currents I1 and I2, resulting in the energy stored in said inductors being transferred to the storage capacitor 33, the equivalent smoothing capacitor 144 and the equivalent load 146. Therefore, the section of the circuit including rectifier diode $43_i$; 143 and smoothing capacitor $44_i$; 144 will also be indicated as energy transfer section 112. During this phase, the storage capacitor 33 is charged.

The design details of the converter depend on its application, and more particularly on the level of the output voltages and the output power it is to provide. These design details specifically include the values of the inductors 32 and 41. In a certain implementation, where the components 32, 33 have specific fixed values, where the turn ratios in transformer 40 are fixed, and where output voltage $V_O$ has a fixed value, it can be shown that the voltage across storage capacitor 33 is proportional to the rms value of the mains input voltage $V_{AC}$ at input 2. This voltage across storage capacitor 33 is always higher than the rectified peak value of the mains input voltage $V_{AC}$ at input 2. Since the converter is intended for universal application, the AC input voltage at the input terminals 2a, 2b may range, for example, from 85 to 270 $V_{rms}$, and the converter should be able to operate within this whole range. In a worst case, the operating voltage that may occur across the storage capacitor 33 is more than 530 V. Therefore, in order to ensure that the storage capacitor 33 is capable of withstanding this worst-case operating voltage, the storage capacitor 33 should be of a 600 V (or more) type, which is not a standard type, or one should use a series arrangement of two standard capacitors of the 300 V type, each having a double capacitance value; in both cases, the costs of the storage capacitor 33 are relatively high. In this context, it should be considered that the storage capacitor 33 is to store energy, which implies that the required capacitance is quite high, which already makes the storage capacitor 33 quite expensive.

Also in view of the high worst-case operating voltage across the storage capacitor 33, the switching device 51 also needs to be of a type which is capable of withstanding a high voltage; particularly, the switching device 51 needs to be of the 700 V or 800 V type.

An important cost saving is achieved by the present invention proposal to limit the operating voltage of the storage capacitor 33. If this worst-case operating voltage is limited to a level below 450 V throughout the input voltage range, the storage capacitor 33 can be implemented by a single standard capacitor of 450 V type (which is preferably an electrolytic type), and the switching device 51 can be implemented by a 600 V type.

According to a preferred embodiment of the invention, also illustrated in FIG. 1, this limitation of the operating voltage of the storage capacitor 33 can be achieved in an elegant and simple way, with just a few low-cost components, by adding a clamping circuit 60 at the energy transfer section 112, i.e., in the FIG. 1 embodiment 1, at the secondary side of the transformer 40. This clamping circuit 60 comprises an auxiliary secondary winding 62, connected in series with an associated rectifier diode 63. The free end of the auxiliary secondary winding 62, i.e. the end not connected to the rectifier diode 63, is connected to the secondary ground GNDS. The free end of the rectifier diode 63, i.e. the end not connected to the auxiliary secondary winding 62, is connected to the regulated output terminal $45_1$, i.e. the output terminal which is connected to the feedback circuit 53.

It is noted, however, that the auxiliary secondary winding 62 and primary winding 41 are connected to ground in opposite ways, as will be explained as follows.

First, it is noted that all windings of a transformer have a phase relationship with each other, determined by magnetic flux. This phase relationship, which is a property of the transformer itself, is indicated by marking corresponding terminals by a dot in FIGS. 1 to 3. Hereinafter, the marked terminal will be referred to as phase-terminal, while the non-marked terminal will be referred to as reference terminal.

The phase terminals of transformer windings can be defined as follows. If in a certain winding (41) a current flowing from phase terminal (48) to reference terminal (47) causes a magnetic flux in a certain direction, then a magnetic flux having the same direction would be caused by a current in another winding ($42_i$; 62) also flowing from phase terminal to reference terminal.

In a transformer, the direction of induced current can be understood as follows. It should be borne in mind that a transformer tends to keep its magnetic flux constant. Therefore, if in a certain winding (41) a current develops, flowing from phase terminal (48) to reference terminal (47), which would cause the increase of magnetic flux in a certain direction, then in another winding ($42_i$; 62) a current will be induced having such a direction that it causes an opposite flux, hence flowing from reference terminal to phase terminal.

As can be seen in FIG. 1, primary winding 41 has its reference terminal 47 directed towards primary ground GNDP and its phase terminal 48 directed away from primary ground GNDP. In the design shown in FIG. 1, intended to generate a positive output voltage at the controlled output terminal $45_1$, the secondary winding $42_1$, which is connected to the controlled output terminal $45_1$ has its marked phase terminal coupled to said controlled output terminal $45_1$ and its non-marked reference terminal coupled to ground GNDS. In contrast, the auxiliary secondary winding 62 has its marked phase terminal 68 coupled to GNDS and its non-marked reference terminal 67 coupled to said controlled output terminal $45_1$ (via auxiliary rectifying diode 63). Thus, if the voltage at the phase terminal 48 of primary winding 41 goes positive, the induced voltage at the counter-phase terminal 67 (directed away from GNDS) goes negative.

Figure 3:
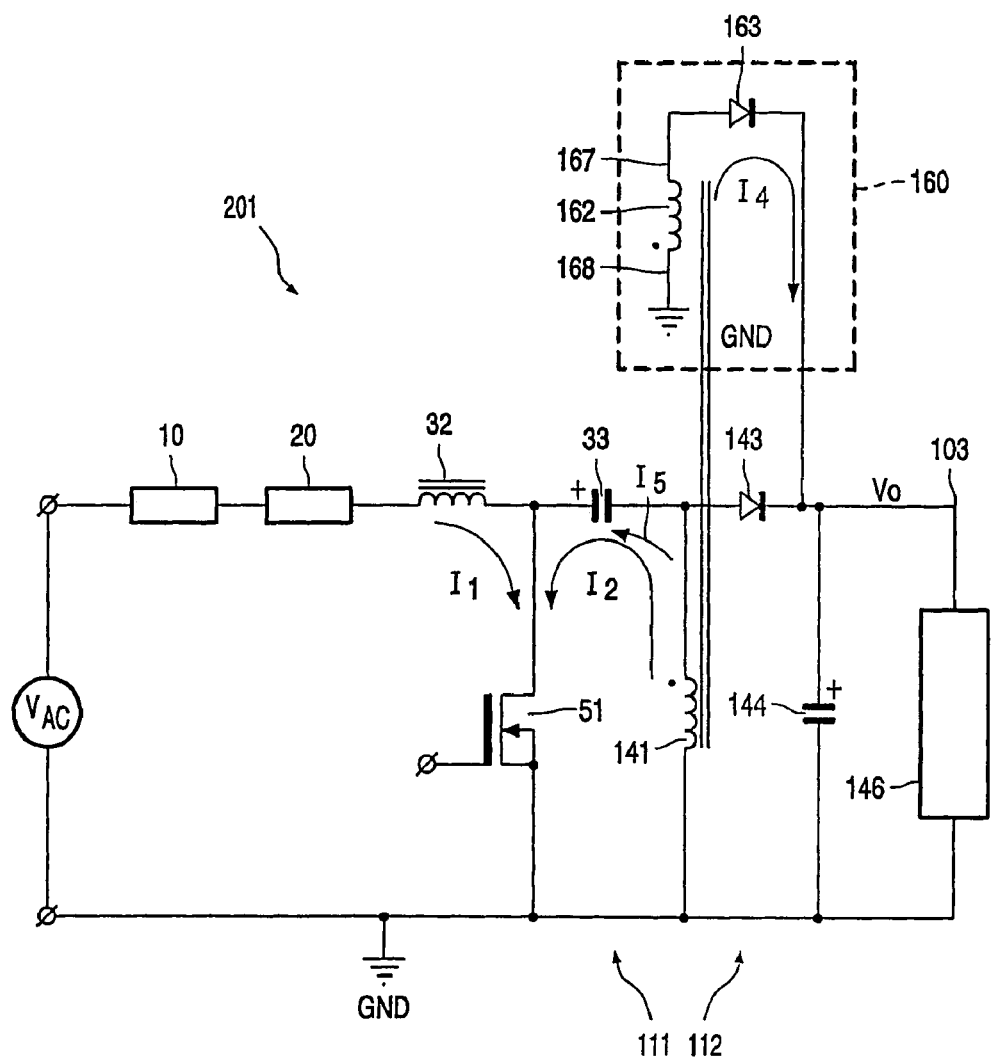
FIG. 3 is a simplified diagram, comparable to FIG. 2, of a SEPIC converter in accordance with the present invention.

Similarly, the invention can be implemented in a design as illustrated in FIG. 2 by adding a clamping circuit 160 at the energy transfer section 112, as illustrated in FIG. 3.

The operation of the SEPIC converter in accordance with the invention will now be explained with reference to FIG. 3, which shows an equivalent circuit of the inventive SEPIC converter 201, which is identical to the SEPIC converter of FIG. 2, with the exception of added equivalent clamping circuit 160. Equivalent clamping circuit 160 comprises a series combination of rectifier diode 163 having its cathode connected to output 103, and coil 162. It should be clear that these two components may change place. Coil 162 is equivalent to the auxiliary secondary winding 62, and is coupled to equivalent inductor 141, such that the voltage $V_{162}$ developed across equivalent coil 162 is proportional to the voltage $V_{141}$ across equivalent inductor 141, in accordance with the formula $V_{162}/V_{141}=N162/N141$, wherein N141 represents the number of turns of the equivalent inductor 141, and N162 represents the number of turns of the equivalent coil 162.

In the above formula, deviations due to losses are ignored for the sake of convenience.

N162 is not an arbitrary number of turns but has been calculated in relation to the regulated voltage $V_O$ at the equivalent output 103, on the one hand, and a desired maximum voltage $V_{CLAMP}$ across storage capacitor 33, in accordance with the formula $N162=N141 \times V_O/V_{CLAMP}$, on the other hand.

It has been explained hereinbefore that the voltage across storage capacitor 33 is proportional to the rms value of the mains input voltage $V_{AC}$ at input 2. Therefore, the desired maximum voltage $V_{CLAMP}$ across storage capacitor 33 corresponds to a certain value of the mains input voltage $V_{AC}$ at input 2; this value will be indicated as limit value $V_{AC,lim}$.

Now, two situations can be distinguished: in a first situation, the rms value of the mains input voltage $V_{AC}$ at input 2 is lower than said limit value $V_{AC,lim}$; in a second situation, the rms value of the mains input voltage $V_{AC}$ at input 2 is higher than said limit value $V_{AC,lim}$.

In said first situation, the voltage across storage capacitor 33 is lower than the allowable maximum value, whereas the voltage $V_{162}$ across equivalent coil 162 is always lower than output voltage $V_O$ and clamping diode 163 is always reverse biased. In that case, equivalent clamping circuit 160 does not become active, and converter 101 operates just as a standard converter 1.

In said second situation, a distinction should be made between the ON phase and the OFF phase of controllable switch 51.

Off Phase

During the OFF phase, the storage capacitor 33 is charged by a current flowing in primary winding 41 from phase terminal 48 to reference terminal 47. This tends to develop, in auxiliary winding 62, an induced current having a direction from reference terminal 67 to phase terminal 68, which is, however, prevented by auxiliary diode 63. With respect to FIG. 3, clamping diode 163 is always reverse biased; no current can flow through equivalent coil 162. In other words, during the OFF phase, equivalent clamping circuit 160 does not become active (the same applies to clamping circuit 60), and converter 101 operates just as a standard converter 1.

On Phase

During the ON phase, as usual, a first current I1 flows through inductor 32 and switch 51, and a second current I2 flows through equivalent inductor 141 and switch 51. These currents store energy in said inductors. With respect to the OFF PHASE, the current in primary winding 41 has changed direction. Equivalent output diode 143 is now reverse biased, so that no current can flow through diode 143.

If the voltage across equivalent coil 162 exceeds the output voltage $V_O$, clamping diode 163 becomes conductive and a current I4 can flow through equivalent coil 162 from phase terminal 168 to reference terminal 167 into equivalent output capacitor 144 and/or equivalent output load 146. This current I4 is associated with a current I5 through equivalent inductor 141 from reference terminal to phase terminal. Induced current I5 also flows through storage capacitor 33, contributing to further sinking energy from storage capacitor 33 and lowering its voltage.

If the voltage across storage capacitor 33 falls below the desired limit $V_{CLAMP}$, the induced current I5 stops because equivalent diode 163 will be reverse biased.

Thus, the maximum voltage across storage capacitor 33 is linked to the regulated output voltage $V_O$, the level of said maximum voltage being determined by turn ratio N162/N141.

Figure 4:
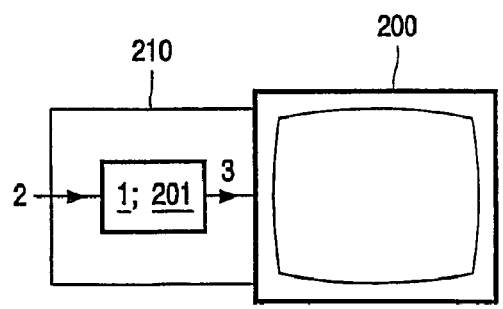
FIG. 4 schematically shows an electronic apparatus with a power supply in accordance with the present invention.

FIG. 4 schematically shows a television set 200 as an example of an electronic apparatus embodying an aspect of the invention. The electronic apparatus 200 comprises a power supply 210 embodying an aspect of the invention. The power supply 210 comprises at least one voltage converter 1; 201 as discussed above, having a plurality of outputs 3 for supplying output voltages as required by the electronic apparatus 200.

It will be evident to a person skilled in the art that the present invention is not limited to the example discussed above, but that alternatives, amendments, modifications and variations are possible within the scope of the invention as defined in the accompanying claims.

For instance, in the embodiment of FIG. 1, the diode 31 can in fact be omitted because the full-wave rectifier bridge 20 already prevents current from flowing in the opposite direction.

Furthermore, still referring to the embodiment of FIG. 1, the diode 31 and the inductor 32 can change place, and also the storage capacitor 33 and the primary winding 41 of transformer 40 can change place.

In the embodiment of FIG. 1, the converter is designed to provide a positive regulated voltage at its output terminal $45_1$, in that the rectifying diode $43_1$ has its anode connected to winding $42_1$ while its cathode is connected to the node with smoothing capacitor $44_1$ and output terminal $45_1$. In such a case, auxiliary rectifying diode 63 has its cathode connected to the node of rectifying diode 43₁, smoothing capacitor 44₁ and output terminal 45₁. However, the converter may also be designed to provide a negative regulated voltage at its output terminal 45₁, in that the rectifying diode 43₁ has its cathode connected to winding 42₁ while its anode is connected to the node with smoothing capacitor 44₁ and output terminal 45₁. In such a case, auxiliary rectifying diode 63 has its anode connected to the node of rectifying diode 43₁, smoothing capacitor 44₁ and output terminal 45₁.

Moreover, it is possible for the phase terminals and reference terminals to change place.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A voltage converter (1; 201) comprising:
   an energy storage section (111) comprising a first series combination of a storage capacitor (33) and a first inductor (41; 141);
   a controllable switch (51) coupled in parallel with said first series combination;
   an energy transfer section (112) comprising a second series combination of a first rectifying diode (43₁; 143) and a first smoothing capacitor (44₁; 144), the first rectifying diode being coupled to the first inductor;
   a first output terminal (45₁) coupled to a node between said first rectifying diode (43₁; 143) and a first smoothing capacitor (44₁; 144);
   feedback means (50; 53, 52) coupled to said output terminal (45₁) for controlling said controllable switch (51); and
   voltage clamping means (60; 160) for clamping a voltage across the storage capacitor (33).

2. A voltage converter according to claim 1, wherein the following formula is satisfied, at least substantially:

$$N62/N41 = V_{OUT,1}/V_{CLAMP},$$

wherein:
   N62 is the number of turns of said second inductor (62; 162);
   N41 is the number of turns of said first inductor (41; 141);
   $V_{OUT,1}$ is the regulated output voltage at said first output terminal (45₁);
   $V_{CLAMP}$ is the maximum allowed voltage across said storage capacitor (33).

3. A voltage converter according to claim 1, wherein said voltage clamping means (60; 160) comprises a second inductor (62; 162) inductively coupled to said first inductor (41; 141), and a second rectifying diode (63; 163) connected in series with said inductor (62; 162);
   wherein said series combination of second rectifying diode (63; 163) and said second inductor (62; 162) is coupled to a reference voltage.

4. A voltage converter according to claim 3, wherein said reference voltage is a voltage at said first output terminal (45₁).

5. A voltage converter according to claim 3, wherein said first inductor (41) has a phase terminal (48) directed away from ground (GND; GNDP), and wherein said second inductor (62; 162) has a phase terminal (68) directed towards ground (GND; GNDS).

6. A voltage converter according to claim 5, wherein said second rectifying diode (63; 163) is arranged between a reference terminal (67; 167) of second inductor (62; 162) and said first output terminal (45₁).

7. A voltage converter according to claim 6, wherein said second rectifying diode (63; 163) has its anode connected to said reference terminal (67; 167) of second inductor (62; 162).

8. A voltage converter according to claim 1, comprising a transformer (40) having a primary winding (41) and at least one secondary winding (42₁);
   wherein said first inductor (41) comprises said primary winding (41), and said first rectifying diode (43₁) is connected in series with a first of said secondary windings (42₁).

9. A voltage converter according to claim 8, wherein said first secondary winding (42₁) has a phase terminal directed towards said output terminal (45₁) and a reference terminal directed towards ground (GND; GNDS).

10. A power supply (210) for generating at least one output voltage on the basis of an input voltage, the power supply comprising a voltage converter according to claim 1.

11. An electronic apparatus (200) such as a monitor or a television, comprising a power supply (210) according to claim 10.

* * * * *